US006900980B2

United States Patent
Christopher

(10) Patent No.: US 6,900,980 B2
(45) Date of Patent: May 31, 2005

(54) SYNCHRONIZATION CRADLE WITH EXPANSION CARD SLOTS

(75) Inventor: David A. Christopher, San Francisco, CA (US)

(73) Assignee: Palm, Inc., Santa Clara, CA (US)

( * ) Notice: Subject to any disclaimer, the term of this patent is extended or adjusted under 35 U.S.C. 154(b) by 104 days.

(21) Appl. No.: 09/847,509

(22) Filed: May 2, 2001

(65) Prior Publication Data

US 2002/0163780 A1 Nov. 7, 2002

(51) Int. Cl.[7] .................................................. G06F 1/16
(52) U.S. Cl. ..................... 361/683; 361/679; 361/684; 709/203; 455/556
(58) Field of Search ................................ 361/683, 686, 361/687, 699, 700, 684, 681; 364/708.1; 709/203, 217, 218, 219, 223, 227, 248; 395/200, 205, 325, 509, 800, 281; 455/556, 558, 575, 551, 552, 422; 348/552, 373, 207, 222, 231

(56) References Cited

U.S. PATENT DOCUMENTS

| | | | | |
|---|---|---|---|---|
| 5,392,447 A | * | 2/1995 | Schlack et al. | ............. 345/863 |
| 5,497,464 A | * | 3/1996 | Yeh | ........................ 395/200.01 |
| 5,604,663 A | | 2/1997 | Shin et al. | .................. 361/686 |
| 5,666,495 A | * | 9/1997 | Yeh | .............................. 395/281 |
| 5,822,546 A | | 10/1998 | George | ....................... 395/281 |
| 5,826,043 A | | 10/1998 | Smith et al. | ................. 395/281 |
| 5,867,218 A | * | 2/1999 | Matsuzaki et al. | .......... 348/373 |
| 5,900,875 A | * | 5/1999 | Haitani et al. | ............... 345/840 |
| 5,907,815 A | * | 5/1999 | Grimm et al. | ............... 455/557 |
| 6,073,031 A | * | 6/2000 | Helstab et al. | ............... 455/557 |
| RE36,769 E | * | 7/2000 | Ozawa et al. | ................. 235/380 |
| 6,118,485 A | * | 9/2000 | Hinoue et al. | ............... 348/373 |
| 6,286,060 B1 | * | 9/2001 | DiGiorgio et al. | ............. 710/31 |
| 6,292,272 B1 | * | 9/2001 | Okauchi et al. | |
| 6,330,618 B1 | * | 12/2001 | Hawkins et al. | ............. 709/248 |
| 6,429,625 B1 | * | 8/2002 | LeFevre et al. | .............. 320/155 |
| 6,453,281 B1 | * | 9/2002 | Walters et al. | ............... 704/200 |

FOREIGN PATENT DOCUMENTS

| | | | | | |
|---|---|---|---|---|---|
| JP | 411243501 A | * | 9/1999 | ......... | H04N/5/225 |
| JP | 02000092171 A | * | 3/2000 | ............ | H04M/1/02 |
| JP | 02001101140 A | * | 4/2001 | ........... | G06F/15/02 |
| JP | 02001101356 A | * | 4/2001 | ......... | G06K/17/00 |
| KR | 2001026970 A | * | 4/2001 | ........... | G11B/20/02 |

OTHER PUBLICATIONS

"Express for Windows User's Guide", Front page and chapters 3, 5.*
An article: "Windows 95 FAQ–Beginners Users Tips".*
An article: "Windows 95 & USB Support".*
The article: "Personal Computer Menu Card International Association Compatible battery and Charging cards", IBM Technical Disclosure Bulletin, Sep. 1993, US vol. 36, Issue 9A, pp. 167–170.*
SD Card Association—Press Room, "Palm Brand Products to Feature Secure Digital Card Slot for Expansion" [online], pps. 1–4 [retrieved on Jan. 6, 2003 from www.sdcard.org/press7.htm].
"Palm's Dual Expansion Architecture", ©2002 Palm, Inc. or its subsidiaries, pps. 1–17.

* cited by examiner

Primary Examiner—Michael Datskovsky
(74) Attorney, Agent, or Firm—Foley & Lardner LLP

(57) ABSTRACT

A synchronization docking station or synchronization cradle for a handheld computer is disclosed. The synchronization cradle includes a data connection configured to communicate data from the docking station to the handheld computer. The synchronization cradle also includes at least one expansion card connector coupled to the docking station configured to communicate data between an expansion card and the docking station.

33 Claims, 3 Drawing Sheets

SYNCHRONIZATION CRADLE WITH EXPANSION CARD SLOTS

FIELD OF THE INVENTION

The present specification relates to accessory devices for portable electronic devices such as, but not limited to, handheld computers. In particular, the present specification relates relates to a synchronization cradle for a handheld computer that is coupled to a personal computer. The synchronization cradle includes at least one expansion card slot in which an expansion card such as a secure digital (SD) card or a multimedia card (MMC) may be inserted. Files stored on the SD card or MMC may be transferred between multiple cards, the handheld computer and the card, or between the card and the computer.

BACKGROUND OF THE INVENTION

Handheld computing devices, palmtops, personal digital assistants (PDAs) or handheld computers typically weigh less than a pound and fit in a pocket. These handheld computers generally provide some combination of personal information management, database functions, word processing, and spreadsheets. Because of the small size and portability of handheld computers, strict adherence to hardware constraints, such as memory and storage hardware constraints, must be maintained. Further, it is desirable to include other accessories to the handheld computer to further its functionalities. Such accessory devices include, positioning devices, audio players, voice recorders, Bluetooth transceivers, digital cameras, tuners, network cards, pedometers, mobile telephone receivers, and the like. Many of these accessory devices require data storage and memory devices to function in a desirable manner.

It is conventional to provide removable memory devices, such as flash memory devices that are coupleable to a handheld computer. Often, it may be desirable to use a variety of types of memory modules with a handheld computer. Each of these memory devices may have a relatively small size. Further, with the standard use of memory modules and cards, and devices, it may be desired that simplified file transfers between memory devices themselves, file transfers between handheld computer and the memory devices, and file transfers between the memory devices and a personal computer or other storage device to which the handheld computer is synchronized.

Accordingly, there is a need for a synchronization device that includes a connector for memory devices and enables transfer of files between multiple memory cards, handheld computer and memory cards, and between personal computer or other storage device and memory cards. Further, there is a need for a synchronization cradle that includes multiple slots for inserting and connecting to memory cards. Further still, there is a need for a synchronization cradle which includes multiple slots which may be used with either SD cards or MMCs.

The techniques herein below extend to those embodiments which fall within the scope of the appended claims, regardless of whether they accomplish one or more of the above-mentioned needs.

SUMMARY OF THE INVENTION

An exemplary embodiment relates to a synchronization docking station for a handheld computer. The synchronization docking station includes a data connection configured to communicate data from the docking station to the handheld computer. The synchronization docking station also includes at least one expansion card connector coupled to the docking station and configured to communicate data between an expansion card and the docking station.

Another exemplary embodiment relates to a system for storing and transferring data. The system includes a mobile electronic device. The system also includes a personal computer. Further, the system includes a synchronization cradle in communication with the personal computer and the mobile electronic device. The synchronization cradle includes at least one receptacle for connecting an expansion card thereto.

Yet another exemplary embodiment relates to a computer system. The computer system includes a communications bus. The computer system also includes a storage device coupled to the communications bus. Further, the computer system includes a memory coupled to the communications bus and a processor coupled to the communications bus. Further still, the computer system includes a synchronization cradle for a handheld computer. The synchronization cradle includes at least one slot for accepting an expansion card, and the synchronization cradle is in communication with the communications bus. Yet further still, the computer system includes a program stored in the memory and running on the processor. The program is configured to display to a user a listing of the contents of the expansion card.

Yet still another exemplary embodiment relates to a method of exchanging digital files between a memory device and a computer. The method includes providing a synchronization device for a handheld computer. The synchronization device includes at least one memory device connector. The method also includes coupling a memory device to the memory device connector. Further, the method includes running a program on the computer, the program configured to provide a user interface used to transfer files. Further still, the method includes reading the digital files on at least one of the memory device and the computer and transferring at least one digital file.

BRIEF DESCRIPTION OF THE DRAWINGS

The invention will become more fully understood from the following detailed description, taken in conjunction with the accompanying drawings, wherein like referenced numerals refer to like elements, in which.

DETAILED DESCRIPTION OF EXEMPLARY EMBODIMENTS

Figure 1:
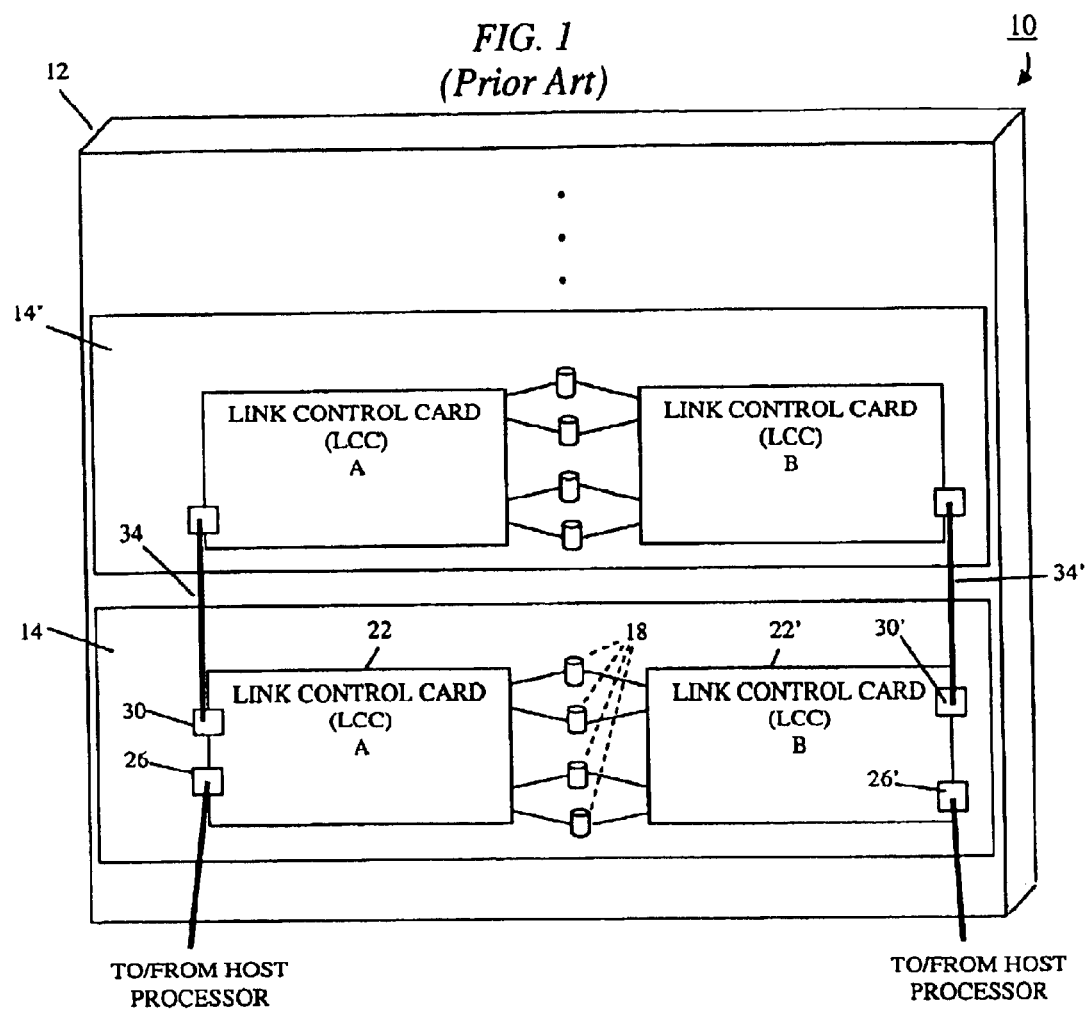
FIG. 1 is a general schematic depiction of a computer system including a personal computer, a handheld computer, and a synchronization cradle with expansion card slots.

Referring to FIG. 1, a computer system 100 is depicted. Computer system 100 includes a personal computer 110 having a keyboard 112 a CPU 114 and a display 116. Personal computer 110 may be any variety of computing devices including, but not limited to, the personal computer of the type shown. Personal computer 110 is in communications with a docking station for a handheld computer, shown as synchronization cradle 120.

Synchronization cradle 120 is in communications with computer 110 via a data link 122. Data link 122 may be any of a variety of data links including, but not limited to, serial communication lines, parallel communication lines, USB communication lines, wireless connections 123 in which a cord such as cord 122 is not used and information is communicated via RF or optical methods. In an exemplary embodiment, synchronization cradle 120 includes a platform 124 configured to support a handheld computer 130 on platform 124. Further, synchronization cradle 124 includes an electrical connector 126 which couples to handheld computer 130 and facilitates communications between handheld computer 130 and computer 110. Further, synchronization cradle 120 includes a button 128 which may be utilized for initiating synchronization or transfer of data between handheld computer 130 and computer 110. Synchronization can also be initiated via keyboard 112 of computer 114. Further, in an alternative exemplary embodiment other buttons may be included on synchronization cradle 120. Such buttons may be utilized for exchanging data between handheld computer 130 and any of a variety of data storage devices and/or memory cards, or for other functions. For example, synchronization cradle 120 may include a plurality of expansion card slots 140 which are configured to accept a variety of expansion card devices such as, but not limited to, secure digital (SD) memory cards 142. Other types of expansion cards or memory devices which may be inserted into slots 140 include, but are not limited to, multimedia cards (MMCs). Further, in an exemplary embodiment, handheld computer 130 may also include a slot or receptacle for receiving an SD or MMC card 144 from which data may be used and/or transferred while the handheld computer is in synchronization cradle 120 or while handheld computer 130 is mobile.

SD memory cards generally are non-volatile memory cards which offer high-storage capacities in the range of 32 megabytes to 256 megabytes and possibly greater storage capacity. Further, SD memory cards offer relatively fast data transfer, flexibility, and security characteristics. Because of the collaboration between SD consortium members, SD cards are a preferred storage medium and many applications for SD cards will likely come into existence. SD memory cards are configured to facilitate transfer and storage of digital files such as, but not limited to document files, audio files, video files, graphic files, and the like. Also, other types of data may be stored on SD memory cards, including, but not limited to books, references, price lists, etc.

During use, a user having files stored on memory devices such as SD card 142 that are inserted into slots 140 of synchronization cradle 120 may be accessed via handheld computer 130 and/or via computer 110. Further, multiple cards 142 may be inserted into multiple slots 140. Accordingly, files may be transferred either between cards 142 inserted into slots 140, between cards 142 and handheld computer 130, and/or between cards 142 and computer 110 as well as between handheld computer 130 and computer 110.

Slots 140 may be configured to accept and electronically couple to either of SD memory cards, MMC memory cards or any other types of flash memory cards. In a particular exemplary embodiment, slots 140 are configured to accommodate and couple to either SD memory cards or MMC memory cards, whichever a user may have available. For example, a user may have stored a collection of music on MMC memory cards. In such a situation, a user would be able to read music files directly from MMC memory cards on which music was stored and transfer the files to the handheld computer, a personal computer, or an SD card. Further, should the user wish to utilize SD memory cards in the future to store a new music collection, an SD memory card could also be accommodated.

In an exemplary embodiment, an electrical connector within expansion slots 140 is used having nine pins configured for use with SD memory cards. Because MMC utilize a seven-pin connector, slots 140 are configured to accommodate the multimedia cards and further are configured to use seven of the nine pins of the SD connector, thereby avoiding any redundancy in electrical connections for the SD or MMC cards.

In a further exemplary embodiment, slots 140 may be used to accommodate a battery pack, which may be a rechargeable battery pack, for example. Such a battery pack may be used to supply power to accessory modules and/or may also be used as an auxiliary power source for handheld computer 130. Such a battery pack is configured to fit into slots 140 and further is configured to utilize any of the pins of the nine-pin SD connector within slots 140.

Figure 2:
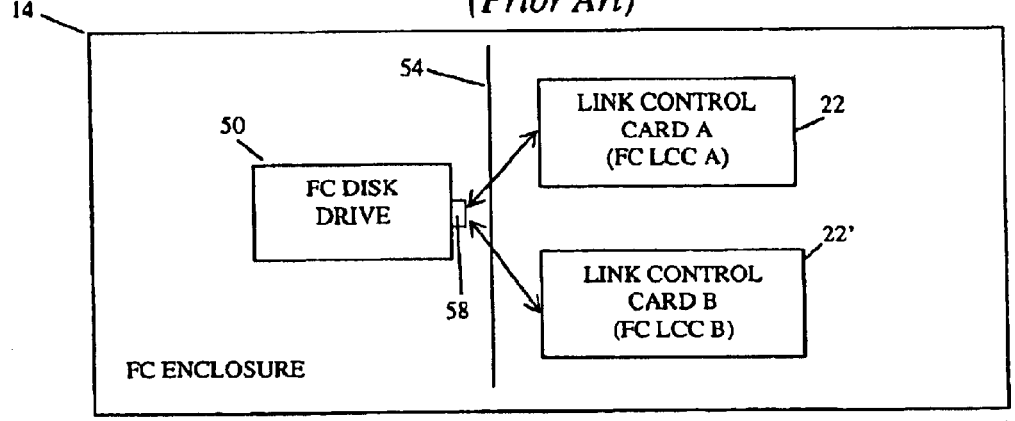
FIG. 2 is a general schematic depiction of an exemplary screen display of a user interface associated with a program that enables handling of data on expansion cards which are inserted into the expansion card slots depicted in FIG. 1.

Referring now to FIG. 2, a display of a user interface 200 for a program running on computer 110, is exemplified. Interface 200 is a user interface for a handheld cradle SD/MMC reader, for example. User interface 200 provides a user the ability to simply drag and drop digital files from one storage medium to another. Such simplified file copying enables the ability to manage and collaborate and share digital files. User interface 200 includes a cards listing area 210 which includes a listing of all the cards which are inserted into slots 140 of synchronization cradle 120. In an exemplary embodiment, card 144, which is an expansion card slot of handheld computer 130, may also be listed in area 210. Cards listed in area 210 may be listed by card name or by slot number. Interface 200 also includes a content area 220 which is configured to list the files which are stored on cards 142 and 144. For example, "Card 1" includes a picture file 230 which is shown having a size of 20 k being a JPEG file and being modified on "Feb. 6, 2001" In an alternative embodiment, any of a variety of characteristics of files listed in area 220 may be used, including, but not limited to, name, size, type, date modified, etc. Further, in an exemplary embodiment, user interface 200 includes a variety of pull-down menus 240 including, but not limited to, a file menu and an edit menu. During use, a user may choose to select a file from area 220 and transfer such file to a storage device on computer 110 by using functions such as cut, copy, paste, and the like from the edit menu. Further, a user may choose to select a file such as picture 230 and cut, copy or paste the file to another memory card. In another exemplary embodiment, user interface 200 enables the transfer of files directly to handheld computer 130.

Figure 3:
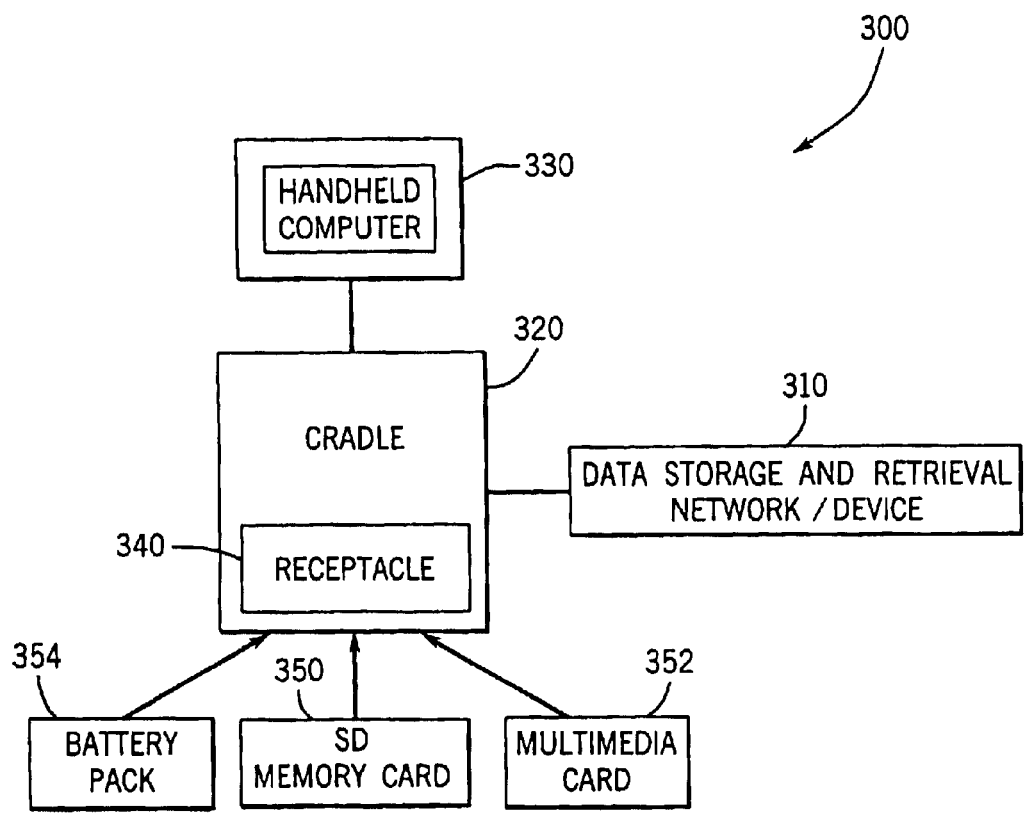
FIG. 3 is a general schematic block diagram of a handheld computer cradle coupled to a data storage and retrieval network/device.

Referring now to FIG. 3, a data storage and retrieval network/device 310 is depicted as part of a computer system 300. Computer system 300 includes a synchronization cradle 320 which is coupled to data storage and retrieval network/device 310. Cradle 320 may be coupled to a handheld computer 330 and includes a receptacle 340 for accepting any of a variety of devices including SD memory card 350, multimedia memory card 352 and a rechargeable battery pack 354. In an exemplary embodiment, receptacle 340 may include multiple slots, each slot being configured to accept any of devices 350, 352 or 354. In the exemplary alternative embodiment depicted, receptacle 340 is configured to accept rechargeable battery pack 354. With a rechargeable battery pack 354 inserted into receptacle 340, receptacle 340 is configured to provide a power input to battery pack 354 such that battery pack 354 may be recharged. For example, users of handheld computer 330 may wish to have interchangeable battery packs such that they will always have a spare battery pack charged. Further, in an alternative embodiment, user interface 200, depicted in FIG. 2, may be configured to provide information relating to rechargeable battery pack 354 that is in receptacle 340, such as, but not limited to battery type, voltage, percent charged, charging time, etc. Further still, battery pack 354 may be a battery pack that is used for any of a variety of other accessory devices, including, but not limited to, such devices as cellular telephones, MP3 players, USB devices, voice recorders, video devices, audio devices, and the like.

In an exemplary embodiment, data storage and retrieval network/device 310 may be any of a variety of locations for storing and retrieving and/or transferring data between handheld computer 330 or between data storage and retrieval/ network device 310 and memory cards 350 and 352. For example, data storage and retrieval network/device 310 may be a dedicated internet device, or may be a direct connection to a web service over an internet connection. Further still, data storage and retrieval network/device 310 may be an interface to a home or local area network.

Figure 4:
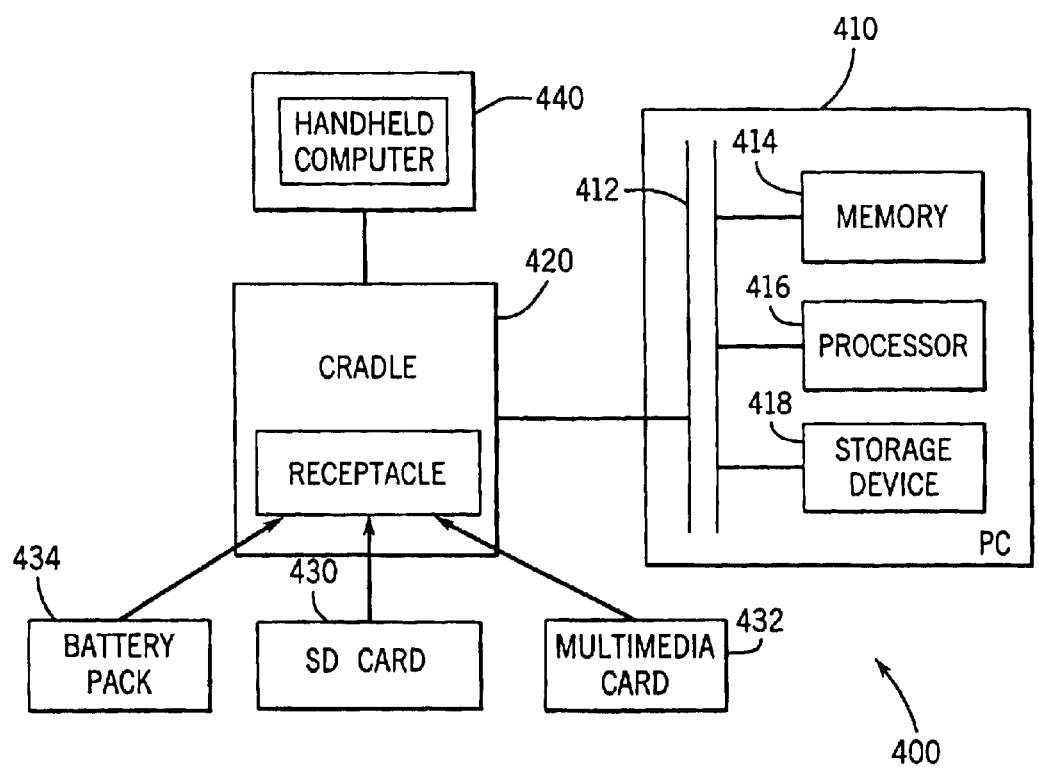
FIG. 4 is a general schematic block diagram of a personal computer coupled to a synchronization cradle for a handheld computer.

Referring now to FIG. 4, another exemplary computer system 400 is depicted. Computer system 400 includes a personal computer 410. Personal computer 410 includes a communications bus 412 with a memory 414, a processor 416 and a storage device 418 coupled thereto. Computer system 400 also includes a synchronization cradle 420 coupled to and in communication with communications bus 412. As described earlier, synchronization cradle 420 includes a receptacle for receiving multiple devices including, but not limited to, SD card 430, multimedia card 432 and battery pack 434. Synchronization cradle 420 is configured to connect to and support handheld computer 440 for transfer of data between cards 430, 432 and/or between handheld computer 440 and computer 410. In an exemplary embodiment, a software program running on PC 410 may be used to transfer data directly from SD card 430 or MMC 432 directly to storage device 418 or from a network coupled to computer 410 to cards 430. Further, the program running on processor 416 from memory 414 may be used to transfer files between SD cards 430 or between MMC cards 432 or between SD card 430 and MMC card 432. Further still, the program running on PC 410 may be used to transfer data from any of SD cards 430 and MMC cards 432 to handheld computer 440.

In a further exemplary embodiment, slots 140 may be configured to receive SD input/output (SDIO) cards, which may be configured with a variety of devices, including but not limited to, Bluetooth or wireless radio and/or networking devices, cameras, microphones, MPEG3 (MP3) players, etc. Such devices could be accessed and used by a user of computer 110 while such devices are plugged into slots 140. Further, such devices could be accessed and used by a user of handheld computer 130 connected to connector 126 and having devices in slot 140.

While the detailed drawings, specific examples, and particular formulations given describe exemplary embodiments, they serve the purpose of illustration only. The hardware and software configurations shown and described may differ depending on the chosen performance characteristics and physical characteristics of the computing devices. For example, the type of computing device, communications bus, or processor used may differ. The systems shown and described are not limited to the precise details and conditions disclosed. Furthermore, other substitutions, modifications, changes and omissions may be made in the design, operating conditions and arrangement of the exemplary embodiments without departing from the scope of the invention as expressed in the appended claims.

What is claimed is:

1. A synchronization docking station for a handheld computer, comprising:
   a data connection configured to communicate data from the docking station to the handheld computer; and
   more than one expansion card connector coupled to the docking station and configured to communicate data between an expansion card and the docking station, the expansion card connector also configured to couple with a rechargeable battery pack for recharging;
   wherein the docking station includes a datalink configured to communicate data to a personal computer, and the personal computer includes a program configured to read the content stored on the expansion card, the program comprising a user interface, the user interface having an expansion card indicating area and an expansion card content area, the interface enabling drag and drop functionality to transfer expansion card content from one card to another card, the docking station also providing recharging of a rechargeable battery pack coupled to the expansion card connector.

2. The synchronization docking station of claim 1, wherein the docking station is a synchronization cradle.

3. The synchronization docking station of claim 1, wherein the more than one expansion card connector is configured to communicate data between the expansion card and the handheld computer.

4. The synchronization docking station of claim 1, wherein the more than one expansion card connector is disposed within an expansion card slot, the expansion card slot being integrated into the docking station.

5. The synchronization docking station of claim 1, wherein the data link is a wireless link.

6. The synchronization docking station of claim 1, wherein the docking station includes a data link configured to communicate data to a communications network.

7. The synchronization docking station of claim 6, wherein the data link is a wireless link.

8. The synchronization docking station of claim 1, wherein the expansion card connector is configured to accept both secure digital (SD) cards and multimedia cards (MMCs).

9. A system for storing and transferring data, comprising:
   a mobile electronic device;
   a personal computer; and
   a synchronization cradle in a communication with the personal computer and the mobile electronic device, the synchronization cradle including more than one receptacle for connecting an expansion card thereto, the more than one receptacle also configured to receive and provide power to a rechargeable battery pack for recharging,
   wherein the personal computer includes a program configured to display the contents of an expansion card located in the at least one receptacle, the program comprising a user interface, the user interface having an expansion card indicating area and an expansion card content area, the interface enabling drag and drop functionality to transfer expansion card content from one card to another card, the synchronization cradle also providing power to a rechargeable battery pack when a rechargeable battery pack is coupled to at least one of the more than one receptacle.

10. The system for storing and transferring data of claim 9, wherein the handheld computer includes a program configured to display the contents of an expansion card located in one of the more than one receptacle.

11. The system for storing and transferring data of claim 9, wherein the mobile electronic device is a handheld computer.

12. The system for storing and transferring data of claim 9, wherein the mobile electronic device includes a cellular telephone transceiver.

13. The system for storing and transferring data of claim 9, wherein the more than one receptacle is configured to receive both secure digital (SD) cards and multimedia cards (MMCs).

14. The system for storing and transferring data of claim 9, wherein the synchronization cradle is configured to communicate with the personal computer over a wireless link.

15. A computer system, comprising:

a communications bus;

a storage device coupled to the communications bus;

a memory coupled to the communications bus;

a processor coupled to the communications bus;

a synchronization cradle for a handheld computer, the synchronization cradle including more than one slot for accepting an expansion card and the synchronization cradle in communications with the communications bus, the more than one slot also configured for accenting a rechargeable battery pack; and a program stored in the memory and running on the processor, the program configured to display to a user a listing of the contents off the expansion card, the program comprising a user interface, the user interface having an expansion card indicating area and an expansion card content area, the interface enabling drag and drop functionality to transfer expansion card content from one card to another card, the synchronization cradle also providing power to a rechargeable battery pack when a rechargeable battery pack is coupled to at least one of the more than one slots.

16. The computer system of claim 15, wherein the program is configured to display the name of files on the expansion card.

17. The computer system of claim 15, wherein the program is configured to display the size of files on the expansion card.

18. The computer system of claim 15, wherein the program is configured to display the type of the files on the expansion card.

19. The computer system of claim 15, wherein the program is configured to display the date the file on the expansion card was last modified.

20. The computer system of claim 15, wherein the program is configured to identify all of the expansion cards received in the more than one slot.

21. The computer system of claim 15, wherein the more than one slot is configured to accept both secure digital (SD) and multimedia cards (MMCs).

22. The computer system of claim 15, wherein the program enables selective transferring of files between the expansion card and the storage device.

23. The computer system of claim 15, wherein the program enables selective transferring of files between the expansion card and the handheld computer.

24. The computer system of claim 15, wherein the program enables selective transferring of files between more than one expansion card in the more than one slot.

25. The computer system of claim 15, wherein the expansion card includes an input/output device.

26. The computer system of claim 25, wherein the expansion card is a SD input/output (SDIO) card.

27. The computer system of claim 25, wherein the input/output device is a camera.

28. The computer system of claim 25, wherein the input/output device is a MPEG3 (MP3) player.

29. A method of exchanging digital files between a memory device and a computer, the method comprising:

providing a synchronization device for a handheld computer, the synchronization device including more than one memory device connector;

coupling a memory device to one of the memory device connectors;

coupling a rechargeable battery pack to one of the memory device connectors;

running a program on the computer, the program configured to provide a user interface used to transfer files, the program comprising a user interface, the user interface having an expansion card indicating area and an expansion card content area, the interface enabling drag and drop functionality to transfer expansion card content from one card to another card;

dragging, on the user interface, a file in the content area associated with the memory device;

dropping, on the user interface, a file in the content area associated with one of another memory device and the computer, reading the digital files on the memory device;

transferring at least one digital file; and providing power to the rechargeable battery pack through one of the memory device connectors.

30. The method of claim 29, wherein the transferring step transfers a digital file between the computer and the memory device.

31. The method of claim 29, wherein the transferring step transfers a digital file between a first memory device and a second memory device.

32. The method of claim 29, further comprising:

coupling a handheld computer to the synchronization device.

33. The method of claim 32, wherein the transferring step transfers a digital file between the handheld computer and the memory device.

* * * * *

UNITED STATES PATENT AND TRADEMARK OFFICE
CERTIFICATE OF CORRECTION

PATENT NO. : 6,900,980 B2
DATED : May 31, 2005
INVENTOR(S) : David A. Christopher It is certified that error appears in the above-identified patent and that said Letters Patent is hereby corrected as shown below:

Column 7,
Line 32, delete "accenting" and insert therefor -- accepting --.

Signed and Sealed this

Eleventh Day of October, 2005

JON W. DUDAS
*Director of the United States Patent and Trademark Office*